July 21, 1953 A. G. TUCCI 2,646,246
WATER FAUCET
Filed Dec. 7, 1949

INVENTOR.
ANTHONY G. TUCCI
BY Fay, Golrick & Fay
ATTORNEYS

Patented July 21, 1953

2,646,246

UNITED STATES PATENT OFFICE 2,646,246

WATER FAUCET

Anthony G. Tucci, Cleveland, Ohio

Application December 7, 1949, Serial No. 131,526

1 Claim. (Cl. 251—46)

This invention is directed to improvements in faucet valves and particularly faucet valves of the domestic screw-stem type used on hot water lines.

An object of the invention is the provision of a valve structure for faucet valves of the type referred to which will seat readily and firmly seal the faucet with relatively limited screw stem pressure.

Another object of the invention is the provision of a durable replacement valve member and stem mounting therefor which can be applied to faucets in use and thereafter serve to prevent "wire drawing" of the faucet seat.

Other objects and advantages of the invention will be apparent from the following detailed description of preferred forms of embodiment of the invention, reference being made to the accompanying drawings wherein—

Figure 1:
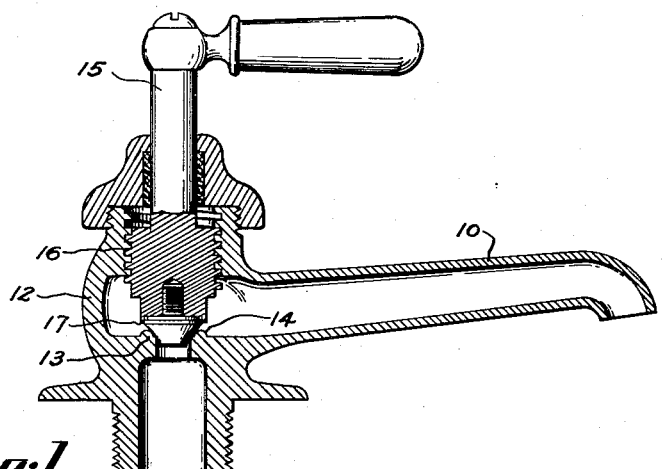
Fig. 1 is a cross-section of a well known type of wash bowl hot water faucet incorporating the features of my invention.

It has been the standard practice for many years to form the bodies of domestic water faucets of cast brass and to machine an annular seat in the faucet body which is semi-circular in cross-section. A screw type valve stem has the inner lower end thereof counterbored to receive and circumferentially retain a flat washer, the washer being held in place by a round head brass screw extending through the washer and threaded into the end of the stem. It has been the general practice to use hard fibre washers manufactured in accordance with various formula to produce a water-resistant valving surface which could be screw compressed by the stem upon the ridged valve seat of the body with sufficient force to seal the faucet. As long as the user of the faucet, and particularly the hot water faucet, closes the faucet positively the fibre washer will give several months to a year in service or until such time as the fibre becomes water logged and deteriorates. Ordinarily such leaky faucets are not repaired until the leaking becomes sufficiently severe to command attention. In the meantime a slight "wire drawing" effect of the leaking water upon the relatively soft metal valve seat has taken place and which usually is not corrected by reseating or forming a new, clean ridge surface on the valve seat. Thereafter washer replacement becomes necessary more frequently until a condition of outright nuisance is reached.

My invention contemplates the use of a new valve sealing material to take the place of the fibre washer and of such shape and mounting that the faucet will become closed with a minimum of effort in the valve stem. The arrangement is such that the valve closing member and its carrier or mounting can serve as a replacement of the fibre or other type of flat washer with only the exercise of a minimum degree of mechanical discretion. I have discovered that a swivel mounted valve plug formed of Nylon will overcome the foregoing mentioned deficiencies of a fibre washered faucet. A Nylon having a tensile strength of about 10,000 to 12,000 pounds per square inch and a hardness test of about Rockwell M84 will have satisfactory physical properties for my purposes and the commercial form of Nylon known as FM 10001 will withstand the onslaught of hot water indefinitely without practical deterioration in the environment with which the present invention is concerned. I have found that it is practically wearless; it can be accurately machined in an economical manner by metal cutting production machines; it holds its shape under varying temperature and stem pressure and water pressure conditions, and if coniform in shape relative to the standard valve seat will be sufficiently compressible to seal the valve with a minimum of manual effort exerted on the valve stem.

In the drawings I show a hot water wash bowl faucet 10 of a generally well known design and having an internally square threaded barrel or body 12 and a valve port wall 13. The valve port wall has an upwardly disposed annular valve seat 14 which in cross-section is usually semi-circular and upon the top of which a fibre washer was seated. The valve stem 15 has male square threads screw fitting the internal threads of the barrel. The lower end of the valve stem is countersunk to provide a thin, annular wall 17 which served to circumferentially engage and reinforce a fibre washer held in the countersink by a brass screw. The brass screw was screwed into an internally threaded central bore in the lower end of the stem.

Figure 4:
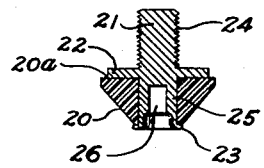
Fig. 4 is a cross-sectional view of the replacing valve and mounting therefor and taken along a central plane as indicated by the line 4—4 of Fig. 3.

I have so designed the swivel mounting for my coniformed valving member 20 as to permit of the use of the threaded bore of the lower end of the valve stem to hold the valve member on the stem end. As shown in Figs. 1 and 4, the mounting comprises a swivel member 21 having a threaded stud end 24 of length and thread size and diameter to fit the threaded bore of the valve stem. The mounting member 21 is provided with a flange 22 of such diameter as to permit insertion thereof within the countersink of the valve stem end. The swivel member 21 is provided with a cylindrical valve supporting end 25 upon which is loosely fitted the coniformed Nylon valve member 20. The cylindrical part 25 of the swivel member has a square socket 26 formed therein for the reception of a socket wrench. The socket is counterbored to provide a thin wall which can be beaded or spun out to provide a retaining flange 23 for loosely retaining the valve member 20 in operative position upon the swivel mounting.

Figure 3:
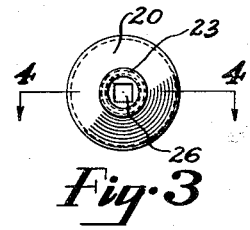
Fig. 3 is a bottom plan view of my durable replacing valve and attachment mounting therefor.
Figure 2:
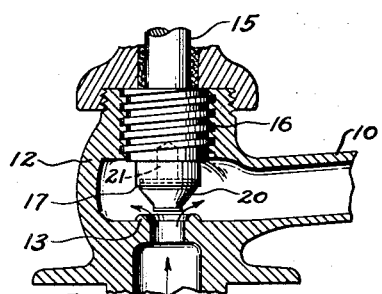
Fig. 2 is a similar view with faucet screw stem adjusted to valve open position.

In installing my improved valve means, the fibre washer retaining screw is discarded, the countersunk end of the valve stem is scraped or cleaned and the assembly shown in Figs. 3 and 4 is then screw mounted in the end of the valve stem by the use of a socket wrench. It is to be understood that the flange 23 and the lower end of the nylon plug 20 could be slotted for receiving the tip of a screwdriver, thus eliminating the use of a socket wrench.

It will be noted that the face angle of the coniform Nylon plug 20 is about 40 degrees relative to the turning axis of the valve stem and that the coniform surface contacts the semi-circular surface of the valve seat ridge in a relatively internal manner so that a wedging action is obtained between the Nylon plug and the ridge surface. While the Nylon material hereinbefore specified is practically non-resilient as compared to rubber washers, nevertheless there is a sufficient compressibility physical characteristic present to cause the coniform surface to seat in a leak-proof manner upon the valve seat ridge with comparatively very little manual turning effort on the valve stem. Also, this same minimum turning effort is sufficient to cause the flat upper end 20a to compress upon the cooperating flat face of the flange 22, thereby to prevent any leaks by reason of the swivel fit between the cylindrical surfaces of the mounting end 25 of the member 21.

Figure 5:
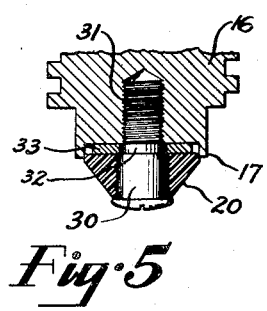
Fig. 5 shows a modification of the valve mounting shown in Fig. 4.

In Fig. 5 I show a modification of the swivel mounting for the Nylon valve member 20 comprising a screw member having a cylindrical portion 30 as a bearing for the valve member 20. The diameter is greater than the outside diameter of the threaded screw part 31 and a washer land 32 of a diameter intermediate the bearing diameter and the thread diameter has a washer member 33 press fitted thereon. The screw threads 31 correspond to the standard threads of the valve stem bore. In this form the action of the Nylon valve member 20 is the same as is obtained in using the assembly shown in Fig. 4. In both forms relative turning movement is obtained between the valve stem and the valve plug once the plug comes in contact with the valve seat.

I claim:

A washer replacement means for a faucet valve of the standard type wherein an annular metallic valve seat surrounds the low pressure end of the valve port and a countersunk inner end of the valve stem carries a disk shaped valve closing washer which bears upon the valve seat, consisting of a valve port sealing washer replacement plug of coniform shape loosely retained upon a cylindrical part of a flanged screw member adapted to be fitted into the threaded end bore of the standard valve stem, said screw member having a rigid flange formation located intermediate its threaded portion and the cylindrical formation thereof and having a flat radial face engaging a flat radial face formed on the upper end surface of the coniform plug whereby a water seal is formed between the upper end surface of the plug and the flange of the screw member when the stem is turned relative to the plug upon seating of the coniform surface of the plug upon the valve seat, and said screw member having a shoulder on the outer end thereof for loosely retaining the valve plug upon the cylindrical formation of the screw member.

ANTHONY G. TUCCI.

References Cited in the file of this patent

UNITED STATES PATENTS

| Number | Name | Date |
| --- | --- | --- |
| 413,518 | Jones | Oct. 22, 1889 |
| 756,035 | Miller | Mar. 29, 1904 |
| 1,164,150 | Whiteman | Dec. 14, 1915 |
| 2,077,766 | Mead | Apr. 20, 1937 |
| 2,252,554 | Carothers | Aug. 12, 1942 |
| 2,277,251 | Palmer | Mar. 24, 1942 |
| 2,315,948 | Esnard | Apr. 6, 1943 |
| 2,520,902 | Fredrickson et al. | Aug. 22, 1950 |

FOREIGN PATENTS

| Number | Country | Date |
| --- | --- | --- |
| 613,823 | Great Britain | of 1948 |

OTHER REFERENCES

Handbook of Plastics, by Simonds and Ellis.